United States Patent [19]

Heilmann et al.

[11] 4,451,619
[45] May 29, 1984

[54] METHOD OF HYDROPHILIZING OR HYDROPHOBIZING POLYMERS

[75] Inventors: Steven M. Heilmann, North St. Paul; Jerald K. Rasmussen, Stillwater; Frederick J. Palensky, St. Paul, all of Minn.

[73] Assignee: Minnesota Mining and Manufacturing Company, St. Paul, Minn.

[21] Appl. No.: 429,986

[22] Filed: Sep. 30, 1982

[51] Int. Cl.$^3$ .............................................. C08F 8/30
[52] U.S. Cl. ................................ 525/379; 525/326.8; 525/326.9; 525/380; 525/382; 525/384
[58] Field of Search ................ 525/326.8, 326.9, 351, 525/359.3, 379, 384, 380, 382

[56] References Cited

U.S. PATENT DOCUMENTS

| | | | |
|---|---|---|---|
| 2,839,430 | 6/1958 | Rimmer | 117/139.5 |
| 3,471,458 | 10/1969 | Mehmedbasich | 260/78.5 |
| 3,475,196 | 10/1969 | Bartell et al. | 117/68.5 |
| 3,488,706 | 1/1970 | Cohen et al. | 96/29 |
| 3,510,342 | 5/1970 | Demmig et al. | 117/68.5 |
| 3,511,894 | 5/1970 | Markert | 525/260 |
| 3,551,391 | 12/1970 | Crocker et al. | 260/78.5 |
| 3,563,937 | 2/1971 | Nickerson | 260/33.4 |
| 3,583,950 | 6/1971 | Kollinsky et al. | 525/326.8 |
| 4,109,070 | 8/1978 | Loshaek et al. | 526/77 |
| 4,228,523 | 9/1981 | Taylor | 430/215 |
| 4,304,705 | 12/1981 | Heilmann et al. | 260/30.4 |

*Primary Examiner*—Joseph L. Schofer
*Assistant Examiner*—Bernard Lipman
*Attorney, Agent, or Firm*—Donald M. Sell; James A. Smith; Lorraine R. Sherman

[57] ABSTRACT

A method of modifying the overall hydrophilic or hydrophobic nature of a high molecular weight free radical addition interpolymer, which is an azlactone-functional interpolymer, with a hydrophilic or hydrophobic nucleophilic compound is disclosed. Only the surface of the interpolymer can by hydrophilized or hydrophobized, as when the interpolymer is a coating, or the modification can take place throughout the entire bulk of the interpolymer.

9 Claims, No Drawings

METHOD OF HYDROPHILIZING OR HYDROPHOBIZING POLYMERS

TECHNICAL FIELD

The present invention relates to a method of modifying high molecular weight polymers so as to impart to them hydrophilic or hydrophobic properties. In another aspect, the present invention relates to hydrophilizing or hydrophobizing the surface of a free radical addition polymer as well as the bulk polymer. The modified polymers are useful as priming agents, water permeable membranes, binders, and low adhesion backsizes.

BACKGROUND ART

The art of modifying polymers so that they exhibit specific properties, for example hydrophilic or hydrophobic properties, is well-known. One method involves the copolymerization of one monomer with a second more hydrophilic or more hydrophobic monomer such that the resultant copolymer exhibits hydrophilic or hydrophobic properties, respectively.

A second method involves the free radical polymerization or radiation grafting of polymers with other monomers or polymers having suitable functional groups which yields a polymer of the desired characteristics.

Both of the above-mentioned methods suffer from severe limitations when it is desired to prepare high molecular weight, soluble, thermoplastic, processable, free radical addition polymers. In such polymers, optimum performance in a particular application is often intimately related to the molecular weight of the polymer. For example, mechanical strength is usually directly related to molecular weight. Thus, it is desirable, if not mandatory, to be able to accurately control the molecular weight of the resultant polymer during a free radical polymerization.

The propagation phase in a free radical polymerization reaction ultimately determines the degree of polymerization, and hence, the molecular weight. Various adverse factors, which depend upon the nature of the free radical initiators, the solvents, the monomers, and other polymerization conditions, can interfere with the propagation step. One such factor is termed chain transfer. Chain transfer is a transfer reaction in which a polymer radical reacts with an atom from another molecule (monomer, solvent, catalyst, etc.) forming a terminated polymer and a new radical. Chain transfer occurs when easily abstractable atoms, particularly hydrogen or halogen atoms, are present during the propagation phase. Chain transfer may occur to monomer, solvent, polymer, or intentionally added chain transfer agents, and lead to a lowering of molecular weight. Hydrogen atoms attached to carbons directly adjacent to oxygen and nitrogen heteroatoms in ethers and amines, respectively, are particularly susceptible to chain transfer reactions.

The effect of chain transfer goes much deeper, however. Not only may polymer molecular weight be sharply curtailed, but abstraction reactions may lead to branching and, ultimately, to crosslinking and insolubilization. Therefore, monomers containing ether- and amine-functional groups are generally to be avoided when the aim is to obtain as an end product a modified, thermoplastic, processable, high molecular weight polymer. This difficulty in obtaining soluble polymers using the above-described methods has been alluded to in literature relating to polymerization of acrylic-functional polyether compounds as in U.S. Pat. Nos. 2,839,430 (column 3; lines 7–13) and 4,109,070 (colunn 5; lines 47–49).

A third method of obtaining a hydrophilic or hydrophobic polymer, which method is of interest in the present invention, is to modify a preformed polymer with a hydrophilic or hydrophobic agent. The preformed polymer may have designated, protected, latent, or pendant functional groups or reaction sites which respond to attack by a suitably chosen nucleophile to impart hydrophilic or hydrophobic properties to the resultant modified polymer. Such a preformed polymer is polyethyleneimine.

U.S. Pat. No. 3,510,342 and U.S. Pat. No. 3,475,196 relate to polyethylenimines which have been modified by acylation with carboxylic acid-functional hydrophobic agents, such as stearic acid, and acid chloride-functional hydrophobic agents, such as stearoyl chloride, respectively, to form the polymeric amides. Generally, these reactions involve the loss of a by-product such as water or hydrogen chloride which must be removed from the system and are therefore undesirable.

U.S. Pat. Nos. 3,471,458, 3,563,937, 3,551,391, and 3,488,706 relate to maleic anhydride copolymers that have been modified by alcohol- or amine-functional hydrophobic or hydrophilic agents to produce polymers useful as detergents in fuels, binders in inks, adhesives, and dye mordants. With both alcohol- or amine-functional reactants, this reaction takes place in stages, the first stage involving formation of the addition product, i.e., an ester-acid in the case of an alcohol and an amide-acid in the case of an amine. Generation of the acid group, a well known hydrophilic group, when one is interested in the addition of a hydrophobic nucleophile would not be desirable. While these acid groups can be further reacted with more of the nucleophilic additive, these subsequent reactions take place with variable efficiency and with prolonged reaction times at high temperatures where crosslinking side reactions often compete. Furthermore, these subsequent reactions are no longer addition reactions but again involve the loss of a by-product, water, which must be removed from the system.

Utilization of a 2-oxazolin-5-one (azlactone) heterocycle as a reaction site to accomplish covalent linkage of a nucleophilic reagent to a polymer is a relatively new concept. Azlactones are particularly desirable because they react with nucleophiles, such as amines, alcohols, and mercaptans, by an addition reaction in which no smaller by-product molecule is produced. The nucleophilic addition can be made to occur under quite mild conditions as disclosed in U.S. Pat. No. 4,304,705 which relates to radiation-curable polymers containing pendant unsaturated peptide groups derived from azlactone-functional polymers that are crosslinkable upon irradiation to give an insoluble product. U.S. Pat. No. 4,288,523 relates to the reaction of certain azlactone-functional polymers with certain nucleophiles to produce polymers capable of undergoing β-elimination in an alkaline environment for use in the formulation of diffusion transfer film units. In col. 21, lines 12–17, this reference states that "the hydrophobicity of the polymer may be increased by introduction of a relatively hydrophobic alkyl group, e.g. n-butyl, into the polymer by means of derivatization with a corresponding alkyl amine or alcohol, e.g. n-butylamine or n-butanol." There is no suggestion in this reference that both hydrophobicity and hydrophilicity can be altered to a significant extent by utilization of a nucleophile having a molecular weight of at least 100.

DISCLOSURE OF THE INVENTION

The present invention provides a method for the formation of thermoplastic, processable, hydrophilic or hydrophobic, high molecular weight polymers. Free radical addition polymers (hereinafter referred to as interpolymers) are modified such that the resultant polymer is more hydrophilic or more hydrophobic than the unmodified free radical addition polymer. The present invention further provides a method for modification of a portion of such addition polymers, for example, the surfaces, as well as the entire (bulk) polymers.

The present invention provides a method of modifying the overall hydrophilic or hydrophobic nature of a free radical addition interpolymer, which is an azlactone-functional interpolymer, by reaction with a hydrophilic or hydrophobic nucleophilic compound. Briefly, the method comprises the steps:

a. interpolymerizing, utilizing conventional free radical conditions in the presence of 0.01 to 5.0 weight percent, preferably 0.1 to 1.0 weight percent, of a free radical initiator,
  (1) 1 to 50 mole percent, preferably 5 to 30 mole percent of an alkenyl azlactone monomer which most preferably is a 2-alkenyl-4,4-disubstituted 2-oxazolin-5-one monomer,
  (2) 50 to 99 mole percent, preferably 70 to 95 mole percent, of at least one free radical addition polymerizable monomer, to form an interpolymer, b. reacting said interpolymer with 0.1 to 1.0 equivalent, preferably 0.4 to 1.0 equivalent (based on polymer-bound azlactone) of a hydrophilic or hydrophobic nucleophile having a molecular weight greater than 100, the hydrophilic nucleophile having a Hydrophilicity Index greater than 30 and the hydrophobic nucleophile having a Hydrophilicity Index less than 20, wherein the Hydrophilicity Index = 
$$\frac{\text{total molecular weight of hydrophilic groups}}{\text{molecular weight of nucleophile}} \times 100$$

c. recovering the resulting hydrophilic- or hydrophobic-modified polymer.

The reaction of paragraph b. takes place generally at room temperature or at moderate temperatures, optionally in the presence of a suitable catalyst. Most suitable catalysts are acid catalysts.

The present invention also provides a method of applying the modified hydrophilic or hydrophobic polymer, prepared according to the above-described method, to a substrate as a coating or overcoating for use as a priming agent, water permeable membrane, binder or low adhesion backsize.

Further, the above-mentioned interpolymer can be applied as a layer on a substrate and the surface of the layer can be treated with either a hydrophilic or hydrophobic nucleophile to form the modified polymer.

In this application:

"Hydrophile" means a hydrophilic compound or hydrophilic nucleophile;

"Hydrophobe" means a hydrophobic compound or hydrophobic nucleophile;

"Polymerizable monomer" means may ethylenically unsaturated compound capable of undergoing a free radical addition polymerization reaction; and "Polymerized monomer" means an ethylenically unsaturated group of a polymerizable monomer has been transformed to a saturated hydrocarbon group in the interpolymer main-chain by means of a free radical polymerization reaction.

DETAILED DISCLOSURE OF THE INVENTION

The present invention provides a process for the formation of thermoplastic, processable, hydrophilic or hydrophobic, high molecular weight polymers represented by Formula V, below. This polymer is prepared by a two-step reaction, the first step of which produces an interpolymer according to Equation 1:

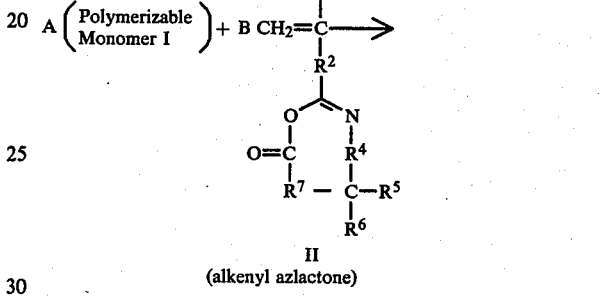

Equation 1

II
(alkenyl azlactone)

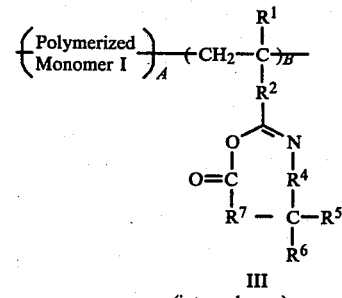

III
(interpolymer)

wherein
$R^1$ is hydrogen or methyl;
$R^2$ is selected from a single bond or

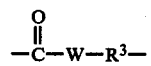

in which $R^3$ is linear or branched alkylene having 1 to 12 carbon atoms, preferably 1 to 6 carbon atoms, and W is —O—, —S— or —NH—; $R^4$ and $R^7$ are independently selected from a single bond and methylene, or hydrocarbon-substituted methylene having 1 to 12 carbon atoms; $R^5$ and $R^6$ are independently alkyl or cycloalkyl having 1 to 12 carbon atoms, aryl or aralkyl having 6 to 12 carbon atoms, or $R^5$ and $R^6$ taken together with the carbon to which they are joined form a 5- or 6-membered carbocyclic ring, or $R^5$ and $R^6$ may be H when at least one of $R^4$ and $R^7$ is methylene; A and B are numbers representing the mole percent of Polymerizable/Polymerized Monomer I and alkenyl azlactone, respctively, where A is in the range of 50 to 99, and preferably 70 to 95 mole percent, and B is in the range of 1 to 50, and preferably 5 to 30 mole percent. Optionally, $R^3$, $R^4$, $R^5$, $R^6$, and R[7] can be substituted by any group unreactive with the azlactone ring, such as halo, cyano, ether, ester, keto, silyl, and sulfide, the carbon-containing groups having up to 12 carbon atoms.

Formula III represents interpolymers of repeating units, wherein each unit is comprised of A percent of units of Polymerized Monomer I and B percent of units of polymerized alkenyl azlactone units of Formula II as an interpolymer. It is intended within the meaning of Formula III that the two types of moieties, derived from Polymerizable Monomer I and alkenyl azlactones of Formula II, appear in various random patterns throughout the interpolymer III. The molecular weight of interpolymer III is in the range of 50,000 to 5,000,000, preferably 100,000 to 3,000,000.

Compounds represented by Polymerizable Monomer I include essentially any free radical addition polymerizable monomer. An excellent discussion of such monomers is contained in C. E. Schildknecht's text "Vinyl and Related Polymers", Wiley, N.Y., 1959. Examples include: the vinyl aromatic monomers such as styrene, α-methylstyrene, 2- and 4-vinylpyridine; α,β-unsaturated carboxylic acids such as acrylic acid, methacrylic acid, itaconic acid, maleic acid, fumaric acid, and crotonic acid; α,β-unsaturated carboxylic acid derivatives such as methyl methacrylate, butyl methacrylate, 2-ethylhexyl methacrylate, ethyl acrylate, butyl acrylate, iso-octyl acrylate, octadecyl acrylate, cyclohexyl acrylate, tetrahydrofurfuryl methacrylate, phenyl acrylate, phenethyl acrylate, benzyl methacrylate, α-cyanoethyl acrylate, maleic anhydride, diethyl itaconate, acrylamide, methacrylonitrile, N,N-dimethylacrylamide, and N-butylacrylamide; vinyl esters of carboxylic acids such as vinyl acetate and vinyl 2-ethylhexanoate; vinyl halides such as vinyl chloride and vinylidene chloride; vinyl alkyl ethers such as methyl vinyl ether, 2-ethylhexyl vinyl ether, and butyl vinyl ether; olefins such as ethylene; N-vinyl compounds such as N-vinylpyrrolidone and N-vinylcarbazole; vinyl ketones such as methyl vinyl ketone; and vinyl aldehydes such as acrolein and methacrolein. The preferred Polymerizable Monomers in the present invention are the α,β-unsaturated carboxylic acid derivatives. As is apparent to one skilled in the art, the above Polymerizable Monomers can be utilized with the azlactone monomers alone or, as is often desirable, combinations of the above Polymerizable Monomers can be utilized.

Examples of azlactone monomers of Formula II are disclosed in U.S. Pat. No. 4,304,705, and include:
2-vinyl-4,4-dimethyl-2-oxazolin-5-one,
2-isopropenyl-4,4-dimethyl-2-oxazolin-5-one,
2-vinyl-4,4-diethyl-2-oxazolin-5-one,
2-vinyl-4,4-dibutyl-2-oxazolin-5-one,
2-vinyl-4-methyl-4-nonyl-2-oxazolin-5-one,
2-vinyl-4-methyl-4-dodecyl-2-oxazolin-5-one,
2-isopropenyl-4-methyl-4-phenyl-2-oxazolin-5-one,
2-isopropenyl-4-methyl-4-benzyl-2-oxazolin-5-one,
2-vinyl-4,4-pentamethylene-2-oxazolin-5-one,
2-isopropenyl-4,4-tetramethylene-2-oxazolin-5-one,
2-allyl-4,4-dimethyl-2-oxazolin-5-one,
2-[2-(N-methacrylamido)ethyl]-4,4-dimethyl-2-oxazolin-5-one,
2-(2-acryloylthioxy)ethyl-4,4-dimethyl-2-oxazolin-5-one,
2-vinyl-4,4-dimethyl-1,3-oxazin-6-one,
2-(2-acryloyloxy)isopropyl-4,4-dimethyl-2-oxazolin-5-one,
2-vinyl-4,5,6,7-tetrahydro-4,4-dimethyl-1,3-oxazepin-7-one.

Fairly standard free radical polymerization conditions are utilized with these monomers except that solvents such as alcoholic solvents that could react with azlactones by a ring-opening addition reaction are to be avoided. Useful solvents include ethyl acetate, toluene, xylene, acetone, methyl ethyl ketone, acetonitrile, tetrahydrofuran, and combinations of these solvents.

Free radical initiators for the polymerization reaction include azobis(isobutyronitrile), benzoyl peroxide, and t-butyl hydroperoxide, in an amount of 0.01 to 5.0 weight percent, preferably 0.1 to 1.0 weight percent.

Temperatures in the polymerization process are usually mild and are those necessary to effect the random copolymerization of Polymerizable Monomer 1 and the alkenyl azlactone of Formula II according to Equation 1. These temperatures are those that are necessary to effect the initiating ability of the free radical initiator. Generally temperatures from room temperature to about 100° C. are useful. A temperature range of 50°–70° C. is preferred.

In the second step of this process, interpolymer (Formula III) can then be reacted in an unreactive solvent such as ethyl acetate, toluene, xylene, acetone, methyl ethyl ketone, acetonitrile, tetrahydrofuran, and combinations of these solvents, or merely the surface can be treated, with either a hydrophilic or a hydrophobic nucleophile indicated by Formula IV, below. The reaction proceeds according to Equation 2:

Equation 2

Interpolymer + HXG ⟶
  III          IV
           (nucleophile)

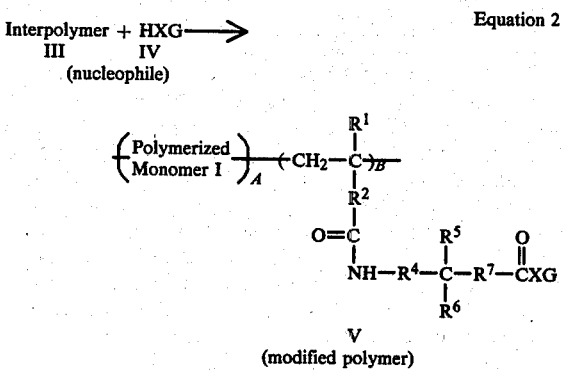

V
(modified polymer)

wherein
$R^1$, $R^2$, $R^4$, $R^5$, $R^6$, $R^7$,
A and B are defined above,
whereas, in addition in HXG (Formula IV)
H is hydrogen,
X is —O—,

or —S—
where $R^8$ is H, G or G', where G' is any hydrophilic/hydrophobic group other than G (to be defined below), or an alkyl group from 1 to 4 carbon atoms.

G is any hydrophilic group such that its Hydrophilicity Index (H.I., to be defined below) has a value of 30 or greater or G is any hydrophobic group such that its H.I. has a value of 20 or less and preferably a value of 10 or less and G'=G or can differ from G, provided that G' is alike in kind with G, i.e., both G and G' are hydrophilic or hydrophobic groups, so long as the Hydrophilicity Index for the hydrophilic group or the hydrophobic group falls within the respective definitions for G above where the Hydrophilicity Index is defined as:

Hydrophilicity Index (H.I.) =
$$\frac{\text{total molecular weight of the hydrophilic groups}}{\text{molecular weight of HXG}} \times 100$$

The Hydrophilicity Index is calculated for various nucleophiles (HXG) as shown in TABLE I, below.

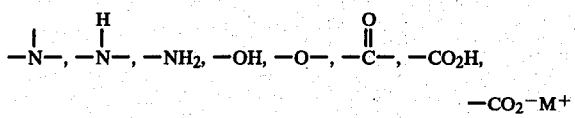

(where $M^+$ is an alkali or alkaline earth metal cation), $-SO_3H$, $-SO_3^-M^+$, $-CONH_2$, $-SH$; $NR_3^{9+}X^-$ (where $R^9 = C_{1-4}$ alkyl and $X^-$ is typically a halide),

TABLE I

| | | Hydrophilicity Index (H.I.) | | | |
|---|---|---|---|---|---|
| HXG Entry name | Structure | Total HXG molecular weight | Hydrophilic component molecular weight | H.I. | Classification |
| (1) Methanol | $CH_3OH$ | 32 | 17 | 53 | hydrophile |
| (2) n-Butanol | $C_4H_9OH$ | 74 | 17 | 23 | neutral |
| (3) n-Octylamine | $C_8H_{17}NH_2$ | 129 | 16 | 12 | hydrophobe |
| (4) n-Octadecylamine | $C_{18}H_{37}NH_2$ | 269 | 16 | 6 | hydrophobe |
| (5) n-Hexadecanol | $C_{16}H_{33}OH$ | 242 | 17 | 7 | hydrophobe |
| (6) Trifluoroethanol | $CF_3CH_2OH$ | 100 | 17 | 17 | hydrophobe |
| (7) N—Methyl-N—(4-hydroxybutyl) perfluorooctanesulfonamide | $HO(CH_2)_4N(CH_3)$—$SO_2C_8F_{17}$ | 585 | 95 | 16 | hydrophobe |
| (8) Methoxyethoxypropylamine | $CH_3OCH_2CH_2O$—$(CH_2)_3NH_2$ | 133 | 48 | 36 | hydrophile |
| (9) Polyethylene oxide | $\text{\textendash}(CH_2CH_2O)_n\text{\textendash}$ | (200–20,000) | (72–7,200) | 36 | hydrophile |
| (10) Iminodiacetic acid | $HN(CH_2CO_2H)_2$ | 133 | 105 | 79 | hydrophile |
| (11) Sodium ω-hydroxyoctadecyl sulfonate | $HO(C_{18}H_{36})SO_3^-Na^+$ | 372 | 120 | 32 | hydrophile |
| (12) Sodium taurinate | $H_2NCH_2CH_2SO_3^-Na^+$ | 147 | 119 | 81 | hydrophite |

The Hydrophilic Index is an empirical concept we have found useful in describing the present invention. One problem with the concept's empiricism is that HXG compounds such as methanol (entry 1; TABLE I), for example, are predicted to be excellent hydrophiles. As is apparent to one skilled in the art, annexation of a methoxy group pendant to a polymer chain would generally have a minimal effect on the polymer's hydrophilicity or hydrophobicity. Methanol artificially ranks as an excellent hydrophile in TABLE I because of its low molecular weight. Therefore, we have found it necessary to impose a lower limit of 100 on the molecular weight for HXG compounds of use in the invention. Above this lower limit, the HXG compounds behaved as expected.

Another reason that we have found it necessary to impose a lower molecular weight limit on the HXG compounds, especially with hydrophobes, is because the hydrophilicity of the polymer is changed by the ring-opening reaction itself. As can be seen in Equation 2 above, two new hydrophilic groups in modified polymer V, i.e.,

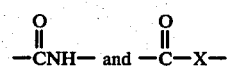

(where X is defined above), are generated. The hydrophilizing effect of the two newly generated groups must be overcome by the hydrophobizing effect of the G group. This can be done only when G is of sufficiently high molecular weight.

Hydrophilic groups are generally those that are functionally capable of forming hydrogen bonds with water. Examples of hydrophilic groups include $$-\overset{H}{\underset{|}{N}}-, -\overset{|}{\underset{|}{N}}-, -NH_2, -OH, -O-, -\overset{O}{\underset{\|}{C}}-, -CO_2H,$$

$$-CO_2^-M^+$$

and the like.

Useful hydrophiles are HXG compounds containing a preponderance, i.e., H.I. greater than about 30, of hydrophilic groups and molecular weights greater than about 100. Examples include entries 8–12 (TABLE I) as well as other alcohols such as 2-(2-methoxyethoxy)ethanol, (2-hydroxyethyl)trimethylammonium chloride, 4-(2-hydroxyethyl)-1-piperazinethanesulfonic acid (sodium salt), isethionic acid (sodium salt), N-(2-hydroxyethyl)acetamide, N-(2-hydroxyethyl)ethylenediaminetriacetic acid (and salts thereof), and 12-hydroxydodecanoic acid (sodium salt); amines such as methoxyethoxypropylamine, methoxydiethoxypropylamine, tetramethylammonium taurinate, N-(3-aminopropyl)-diethanolamine, and poly(oxyalkylene)monoamines (Jefferson ® M-series); and mercaptans such as mercaptosuccinic acid, thioglycolic acid (sodium salt), and 3-mercaptopropionic acid.

Most useful hydrophobes are HXG compounds containing a lesser amount, such that H.I. is less than about 20, of hydrophilic groups and molecular weights greater than about 100. Examples include entries 3–7 in TABLE I above as well as other alcohols such as dodecanol, octadecanol, (perfluoroheptyl)methanol, and heneicosanol; amines such as phenethylamine, dioctadecylamine, and 1,5-dimethylhexylamine; and mercaptans such as dodecyl mercaptan.

Reaction of the interpolymer with the HXG compound is conveniently accomplished by the addition of the HXG compound directly to a solution of the interpolymer (Formula III). No additional ingredients are required for the primary amine-functional HXG compounds, but catalysts are required for the reaction to proceed at a reasonable rate at room temperature with the alcohol- and mercaptanfunctional HXG compounds. While the literature, based chiefly on ring-opening reactions of the vinyl azlactone monomer, discloses that tertiary amines or Brønsted acids such as p-toluenesulfonic acid are effective with simple alcohols such as methanol or ethanol, we have found that tertiary amines such as triethylamine or 4-dimethylaminopyridine, in contrast to the teachings of U.S. Pat. No. 4,288,523, are almost totally ineffective for the reaction of interpolymer of Formula III and the hydrophiles/hydrophobes of the present invention. The Brønsted Acids are excellent catalysts, however, as are other Lewis Acids such as $BF_3$ etherate, $AlCl_3$, $SnCl_4$, and $TiCl_4$. Amounts of the catalyst can vary from 0.01 to 5.0 weight percent, and preferably it is 0.1 to 2.0 weight percent. The progress of the ring-opening reaction can be conveniently followed by recording the infrared spectrum of the reaction mixture and observing the disappearance of the carbonyl stretching absorption.

It is also contemplated as being within the scope of the invention to react interpolymer III as a solvent-cast article or film with the HXG compound. The HXG compound, either in solution (useful solvents include ethyl acetate, toluene, xylene, acetone, methyl ethyl ketone, acetonitrile, tetrahydrofuran, and combinations of these solvents) or without solvent when the HXG compound is liquid at the application temperature and, optionally, with catalyst present, is coated onto the surface of interpolymer III and is reacted therewith. Depending on the reactants, this surface treatment may be sufficient to obtain the desired modifying effect.

The hydrophilic or hydrophobic nature of a substance can be evaluated by contact angle measurements as described in "Contact Angle, Wettability, and Adhesion", by F. M. Fowkes, American Chemical Society, Washington, D.C., 1964. In general, a hydrophilization process of the invention is manifested by a decrease of the contact angle of water with a film of the modified polymer relative to the contact angle measured with the unmodified polymer. Conversely, a hydrophobization process of the invention results in an increase in the contact angle measurement, again relative to the unmodified polymer.

The effects of the hydrophilizing/hydrophobizing method taught in the present invention can result in significant property changes of a modified polymer relative to the unmodified polymer. Properties such as adhesion, processability, lubricity, ink receptivity, abrasion resistance, and static elimination can be varied significantly using the method of the present invention. The modified polymers of the present invention are useful as priming agents, binders, water permeable membranes, and low adhesion backsizes. As mentioned above, modification of the interpolymer may take place on the surface of the coated interpolymer or with the interpolymer in solution.

Objects and advantages of this invention are further illustrated by the following examples, but the particular materials and amounts thereof recited in these examples, as well as other conditions and details, should not be construed to unduly limit this invention.

EXAMPLE 1

Preparation of an interpolymer of methyl methacrylate with 2-vinyl-4,4-dimethyl-2-oxazolin-5-one (vinyl dimethylazlactone) (90:10 parts by weight or a mole ratio of 93:7).

A one liter screw-capped bottle was charged with methyl methacrylate (270 g; 2.70 moles), vinyl dimethylazlactone (30 g; 0.22 mole), ethyl acetate solvent (500 ml; 450 g) and azobis(isobutyrontrile) initiator (1.5 g; 0.01 mole). The ingredients were mixed and the resultant solution was sparged with nitrogen for 5 minutes before being tightly sealed. The polymerization vessel was then tumbled and heated at 60° C. for a period of 24 hours. The viscous polymer solution possessed a polymer solids content of 38.8 percent (97 percent conversion of monomer to polymer) and exhibited an inherent viscosity of 0.62 deciliters per gram in tetrahydrofuran at 30° C. Spectroscopic data indicated the presence of the interpolymer.

The following examples describe the reaction of the interpolymer prepared as described in EXAMPLE 1 with various nucleophiles HXG to give the desired resultant modified polymer (Formula V).

EXAMPLE 2

To a solution containing 3.06 g of an interpolymer prepared as in EXAMPLE 1 and 0.316 g (0.002 mole) of polymer-bound vinyl dimethylazlactone were added 0.59 g (0.002 mole) of the nucleophile octadecylamine (Aldrich Chemical Company, Milwaukee, WI) and 9.75 g of tetrahydrofuran (to achieve a final polymer solids of 20 percent by weight). The solution was stirred at room temperature for about 16 hours. Infrared spectroscopy indicated the formation of amide groups in the modified polymer.

The modified polymer solution was diluted to 10 percent solids by weight by addition of 18.3 g of tetrahydrofuran. A portion of the solution was then coated by means of a #16 wire-wound rod (R.D. Specialities, Inc., Webster, NY) onto polyester film (0.01 mm, 4 mils) (E. I. DuPont de Nemours, Wilmington, DE) providing a dry coating thickness, when dried in an air-circulating oven at 88° C. (190° F.) for 10 minutes, of about 7.5 microns.

Contact angle measurements were recorded using a 5 microliter drop of distilled water and were obtained with a Contact Angle Goniometer (Gaertner Scientific Corporation, Chicago, IL) using a protractor arrangement and a magnification factor of 7.5. A value of 99° was recorded for Sample 1, as reported in TABLE II, below, indicating a distinctly hydrophobic character being imparted to this modified polymer since unmodified poly(methyl methacrylate) was reported by N. L. Jarvis, R. B. Fox, and W. A. Zisman, *Adv. Chem.*, 43, 323 (1964) to be 76°.

EXAMPLE 3

A modified interpolymer was prepared according to the procedure of EXAMPLE 2 with the exception that the nucleophile N-methyl-N-(4-hydroxybutyl)perfluorooctanesulfonamide (see U.S. Pat. No. 2,803,615) was reacted with the interpolymer III and that ethanesulfonic acid (0.1 g) was added as a catalyst. A film of this resultant modified polymer (Formula V), prepared as shown in EXAMPLE 2, was decidely hydrophobic as indicated by a contact angle of 123° for Sample 2, given in TABLE II, below.

EXAMPLE 4

EXAMPLE 3 was repeated with the exception that nucleophile Carbowax 350 (approximate molecular formula $HO(CH_2CH_2O)_{7-8}CH_3$, Union Carbide Corporation, New York, NY) was used to give a hydrophilically modified polymer (Formula V). A film of this modified polymer displayed a contact angle of 61° as Sample 3 reported in TABLE II, below.

EXAMPLE 5

EXAMPLE 2 was repeated with the exception that the tetramethylammonium salt of taurine (prepared by mixing equimolar quantities of taurine and tetramethylammonium hydroxide in methanol) was the nucleophile used. In this instance a small quantity (5 ml) of methanol was added to maintain solution of the resultant modified polymer (Formula V). A film of this modified, hydrophilic polymer showed a contact angle of 59° for Sample 4 as stated in TABLE II, below.

EXAMPLE 6

This example illustrates utilization of the modification method described in the invention to improve the adhesion of the modified polymer to a surface.

Interpolymer (Formula III) of EXAMPLE 1 was reacted with methoxyethoxypropylamine (Jefferson Chemical Co., Belleaire, TX), coated, and dried on a polyester film as described in EXAMPLE 2. The resulting film, which possessed excellent clarity, was scratched several times in a cross-shaped manner with a laboratory probe. Scotch ® brand Magic Transparent Tape (No. 810, 3M, St. Paul, MN) was then applied with firm pressure over the abraded area. With a rapid motion, the tape was removed. The modified film was left completely intact.

When the above test was performed using a film of poly(methyl methacrylate) (Lucite ® 40, E. I. DuPont Company, Wilmington, DE) almost complete delamination of the poly(methyl methacrylate) film from the polyester film occurred.

EXAMPLE 7

This example illustrates utilization of the modification method described in this invention to lower the electrical resistivity, i.e., improve the electrical conductivity, of a polymer.

The volume resistivity of a film of the modified polymer of EXAMPLE 4 was measured according to ASTM D-257-78. The measurement was recorded using a DC Amplifier-Electrometer Type No. 12340-A (General Radio Company, Concord, MA) and a power supply (Model No. 711A; Hewlett-Packard Company, Loveland, CO). A value of $8.8 \times 10^6$ ohm-cm was recorded, whereas a volume resistivity of $5.8 \times 10^{14}$ ohm-cm was recorded with the unmodified polymer (Lucite ® 40).

TABLE II

Contact Angle Measurements on Modified Polymers (Formula V) From Reaction of Interpolymer (Formula III) With Nucleophiles

| Sample number | Nucleophile | Contact[a] angle of resultant modified polymer |
|---|---|---|
| 1 | $H_2NC_{18}H_{37}$ | 99° |
| 2 | $HO(CH_2)_4NSO_2C_8F_{17}$ with $CH_3$ on N | 123° |
| 3 | $HO(CH_2CH_2O)_{7-8}CH_3$ | 61° |
| 4 | $H_2NCH_2CH_2SO_3{}^- NMe_4{}^+$ | 59° |

[a]Contact angle of polymethyl methacrylate is 76° (see N. L. Jarvis, R. B. Fox, and W. A. Zisman, Adv. Chem., 43, 323 (1964).

Various modifications and alterations of this invention will become apparent to those skilled in the art without departing from the scope and spirit of this invention, and it should be understood that this invention is not to be unduly limited to the illustrative embodiment set forth herein.

We claim:

1. A method for preparing thermoplastic, processable, hydrophilic- or hydrophobic-modified polymers comprising the steps:
   (a) interpolymerizing at a temperature in the range of room temperature to 100° C. in the presence of an amount of free radical initiator in the range of 0.01 to 5.0 weight percent
      (1) 1 to 50 mole percent of an alkenyl azlactone monomer,
      (2) 50 to 99 mole percent of at least one free radical addition polymerizable monomer, to form an interpolymer, said monomer being selected from the group consisting of vinyl aromatic compounds, α,β-unsaturated carboxylic acids and their derivatives, vinyl esters of carboxylic acids, vinyl halides, olefins, N-vinyl compounds, vinyl ketones, and vinyl aldehydes;
   (b) reacting in a ring-opening reaction at room or moderate temperatures in an unreactive solvent said resulting interpolymer with 0.1 to 1.0 equivalents, based on polymer-bound azlactone, of an alcohol- or amino-functional hydrophilic or hydrophobic nucleophile having a molecular weight greater than 100, said hydrophilic nucleophile having a Hydrophilicity Index greater than 30 or said hydrophobic nucleophile having a Hydrophilicity Index less than 20, and having the formula

HXG wherein
   H is hydrogen,
   X is equal to —O—, or

and wherein $R^8$ is equal to H, G, or G', wherein G' is any other hydrophilic or hydrophobic group other than G, or an alkyl group having from 1 to 4 carbon atoms,
   G is any hydrophilic group such that its Hydrophilicity Index has a value of at least 30 or G is any hydrophobic group such that its Hydrophilicity Index has a value of 20 or less, and G' is equal to G or can differ from G, provided that G' is alike in kind with G and the Hydrophilicity Index for the hydrophilic group or the hydrophobic group falls within the respective limitations for G;
   with the proviso that said reacting step takes place in the presence of 0.01 to 5.0 weight percent of a Bronsted or Lewis acid catalyst when said hydrophilic nucleophile is alcohol-functional; and
   (c) recovering the resulting hydrophilic- or hydrophobic-modified polymer.

2. The method according to claim 1 wherein said alkenyl azlactone monomer has the formula

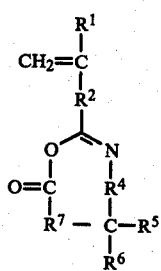

wherein

R¹ is hydrogen or methyl;

R² is selected from a single bond or

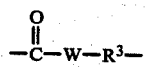

in which R³ is alkylene having 1 to 12 carbon atoms preferably 1 to 6 carbon atoms, and W is —O—, —S— or —NH—;

R⁴ and R⁷ are independently selected from a single bond and methylene, or substituted methylene having 1 to 12 carbon atoms;

R⁵ and R⁶ are independently alkyl or cycloalkyl having 1 to 12 carbon atoms, aryl or aralkyl having 6 to 12 carbon atoms, or R⁵ and R⁶ taken together with the carbon to which they are joined form a 5- or 6-membered carbocyclic ring, or R⁵ and R⁶ may be H when at least one of R⁴ and R⁷ is methylene.

3. The method according to claim 2 wherein said alkenyl azlactone monomer is a 2-alkenyl-4,4-disubstituted 2-oxazolin-5-one.

4. The method according to claim 1 wherein said interpolymer has the formula

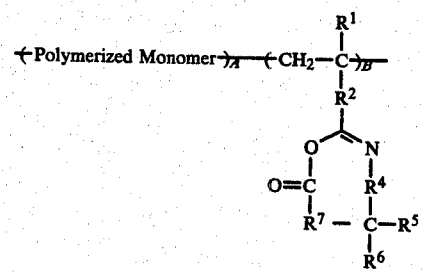

wherein

R¹, R², R³, R⁴, R⁵, R⁶, R⁷ are as defined in claim 2,

A and B are numbers representing mole percent, A being in the range of 50 to 99 mole percent, and B being in the range of 1 to 50 mole percent, the A and B units being randomly positioned in the interpolymer.

5. The method according to claim 1 wherein said mole percent of polymerizable monomer units in said interpolymer is in the range of 70 to 95.

6. The method according to claim 1 wherein said alkenyl azlactone monomer is selected from the group consisting of 2-vinyl-4,4-dimethyl-2-oxazolin-5-one, 2-isopropenyl-4,4-dimethyl-2-oxazolin-5-one, 2-vinyl-4,4-diethyl-2-oxazolin-5-one, 2-vinyl-4,4-dibutyl-2-oxazolin-5-one, 2-vinyl-4-methyl-4-nonyl-2-oxazolin-5-one, 2-vinyl-4-methyl-4-dodecyl-2-oxazolin-5-one, 2-isopropenyl-4-methyl-4-phenyl-2-oxazolin-5-one, 2-isopropenyl-4-methyl-4-benzyl-2-oxazolin-5-one, 2-vinyl-4,4-pentamethylene-2-oxazolin-5-one, 2-isopropenyl-4,4-tetramethylene-2-oxazolin-5-one, and 2-vinyl-4,4-dimethyl-1,3-oxazin-6-one.

7. The method according to claim 1 wherein said at least one polymerizable monomer is selected from the group consisting of styrene, methyl methacrylate, butyl methacrylate, iso-octyl acrylate, octadecyl acrylate, N,N-dimethylacrylamide, vinyl chloride, and N-vinylpyrrolidone.

8. The method according to claim 3 wherein said 2-alkenyl-4,4-disubstituted 2-oxazolin-5-one monomer is 2-vinyl-4,4-dimethyl-2-oxazolin-5-one.

9. The method according to claim 1 wherein said nucleophile is selected from the group consisting of
(a) hydrophiles: 2-(2-methoxyethoxy)ethanol, methoxyethoxypropylamine, and methoxydiethoxypropylamine, and
(b) hydrophobes: octadecylamine, N-methyl-N-(4-hydroxybutyl)perfluorooctanesulfonamide, and perfluoroheptylmethanol.

* * * * *